US008884143B2

(12) United States Patent
Kuijt et al.

(10) Patent No.: US 8,884,143 B2
(45) Date of Patent: Nov. 11, 2014

(54) MUSICAL INSTRUMENT

(75) Inventors: Eibert Johannes Kuijt, TJ Hoogland (NL); Anthonius Johannus Albertus Kooiman, Ed De Meern (NL)

(73) Assignee: Le Freque Holding B.V., Ca Harderwijk (NL)

( * ) Notice: Subject to any disclaimer, the term of this patent is extended or adjusted under 35 U.S.C. 154(b) by 30 days.

(21) Appl. No.: 13/882,256

(22) PCT Filed: Oct. 28, 2011

(86) PCT No.: PCT/NL2011/050733

§ 371 (c)(1),
(2), (4) Date: Jul. 16, 2013

(87) PCT Pub. No.: WO2012/078035

PCT Pub. Date: Jun. 14, 2012

(65) Prior Publication Data

US 2013/0283996 A1 Oct. 31, 2013

(30) Foreign Application Priority Data

Oct. 29, 2010 (NL) ..................................... 2005597

(51) Int. Cl.
*G01D 9/00* (2006.01)
*G10D 7/08* (2006.01)
*G10D 9/00* (2006.01)

(52) U.S. Cl.
CPC ... *G10D 9/00* (2013.01); *G10D 7/08* (2013.01)
USPC ............................................................ 84/330

(58) Field of Classification Search
CPC ........... G10D 9/00; G10D 9/005; G10D 7/08; G10D 7/066
See application file for complete search history.

(56) References Cited

U.S. PATENT DOCUMENTS 1,163,222 A * 12/1915 Dennis ............................ 84/386
1,443,122 A * 1/1923 Gemeinhardt .................. 84/386

(Continued)

FOREIGN PATENT DOCUMENTS

NL 1 035 064 C2 8/2009
WO 2003/012773 A1 2/2003

OTHER PUBLICATIONS

JR: "Re: lefreQue", Saxforum.nl, Apr. 15, 2011. pp. 1-10, XP002644749, Retrieved from the Internet: URL:www.saxforum.nl/viewtopic.php?f=7&t=61 67 [retrieved on Jun. 24, 2011] p. 5 entry "door JR >> Apr. 15, 2011, 16:05".

(Continued)

*Primary Examiner* — Robert W Horn
(74) *Attorney, Agent, or Firm* — Ladas & Parry LLP

(57) ABSTRACT

Musical instrument having a hollow resonator, and a casing, wherein the resonator comprises a first part and a second part, with a coupling between the first part and the second part, the coupling being bounded by a transition edge between the first part and the second part, wherein the instrument is provided with a sound bridge spaced from the transition edge and one or more tensioning elements for arranging the sound bridge under clamping force in abutting contact onto the exterior of the resonator, wherein at a first outer end the sound bridge is provided with a first contact member which is arranged under clamping force in abutting contact onto the first part of the resonator and wherein at a second outer end the sound bridge is provided with a second contact member arranged under clamping force in abutting contact onto the second part of the resonator.

21 Claims, 9 Drawing Sheets

(56) References Cited

U.S. PATENT DOCUMENTS

| | | | | | |
|---|---|---|---|---|---|
| 1,705,634 | A | * | 3/1929 | Bettoney | 84/382 |
| 1,736,880 | A | | 11/1929 | Gulick | |
| 1,870,211 | A | | 8/1932 | Smith | |
| 2,098,457 | A | * | 11/1937 | Loomis | 84/386 |
| 2,425,796 | A | * | 8/1947 | Gillespie | 84/385 R |
| 4,178,830 | A | * | 12/1979 | Ramirez | 84/388 |
| 4,258,605 | A | * | 3/1981 | Lorenzini | 84/386 |
| 4,515,061 | A | * | 5/1985 | Ferron | 84/394 |
| 4,635,525 | A | * | 1/1987 | Valentino | 84/453 |
| 5,249,499 | A | * | 10/1993 | Goldstein et al. | 84/386 |
| 5,864,076 | A | * | 1/1999 | Eder | 84/382 |
| 6,054,644 | A | | 4/2000 | Allen et al. | |
| 2012/0227567 | A1 | * | 9/2012 | Barberot et al. | 84/387 R |
| 2013/0283996 | A1 | * | 10/2013 | Kuijt et al. | 84/330 |

OTHER PUBLICATIONS

Thomas, P.: "LefreQue on test: Blindfold Sound files", Jul. 23, 2012, XP002682071, Retrieved from the Internet: URL:http://tamingthesaxophone.com/saxophone_e-lefreque.html [retrieved on Aug. 21, 2012].

Jazz, Is All: "Forum discussion: "What the LefreQue?"", Aug. 2, 2012. XP55035986, Retrieved from the Internet: URL:http://forum.saxontheweb.net/showthread.php?168693What-the-LefreQue/page7 [retrieved on Aug. 21, 2012].

* cited by examiner

MUSICAL INSTRUMENT

RELATED APPLICATION INFORMATION

This application is a 371 of International Application PCT/NL2011/050733 filed 28 Oct. 2011 entitled “Musical Instrument”, which was published in the English language on 14 Jun. 2012, with International Publication Number WO 2012/078035 A2, and which claims priority from Netherland Patent Application No. 2005597 filed 29 Oct. 2010, the contents of which are incorporated herein by reference.

BACKGROUND OF THE INVENTION

The invention relates to a musical instrument, particularly a wind instrument.

A known wind instrument comprises a resonator tube having a mouthpiece and a sound exit. The resonator tube is provided with one or more tube segments that bound a continuous column of air between the mouthpiece and the sound exit. At the location of the transitions in between them, the mouthpiece, the sound exit and the tube segments are connected to each other in an airtight manner by soldered joints, slide fits and/or press fits with cork. By blowing air via the mouthpiece into the wind instrument the column of air in the resonator tube can be set into vibration. The column of air set into vibration moves through the resonator tube in the direction of the sound exit and produces a sound at the sound exit. To a certain degree the resonator tube takes over the vibrations of the column of air, which influences the sound. This results in a produced sound comprising a wide spectrum of sound frequencies that are characteristic of the specific wind instrument.

The couplings between the mouthpiece, the sound exit and the tube segments of the resonator tube influence the way in which the resonator tube vibrates along with the vibrating column of air. Couplings such as soldered joints, slide fits and press fits with cork transmit certain frequencies badly or not at all, as a result of which mainly high and low frequencies of the produced sound are lost before they reach the sound exit.

It is an object of the invention to provide a musical instrument with which the produced sounds comprise a wide spectrum of frequencies.

SUMMARY OF THE INVENTION

According to a first aspect the invention provides a musical instrument, particularly a wind instrument, having a hollow resonator, wherein the resonator is provided with a casing bounding a continuous column of air and an opening in the casing for producing a sound through the opening, wherein when used the column of air is set into vibration, wherein the casing at least partially takes over the vibration of the column of air, wherein the resonator comprises a first part and a second part in series, wherein the musical instrument is provided with a coupling between the first part and the second part, wherein at the side of the casing facing the outside the coupling is bounded by a transition edge between the first part and the second part, wherein the musical instrument is provided with a sound bridge and one or more tensioning elements for arranging the sound bridge under clamping force in abutting contact onto the exterior of the resonator, wherein at a first outer end the sound bridge is provided with a first contact member which is arranged under clamping force in abutting contact onto the first part of the resonator, wherein at a second outer end the sound bridge is provided with a second contact member which is arranged under clamping force in abutting contact onto the second part of the resonator, and wherein the sound bridge is spaced apart from the transition edge. The sound bridge can be supplied separate from the musical instrument and be arranged onto the resonator of the musical instrument by means of the tensioning elements. The sound bridge can span the coupling without directly contacting the transition edge. In that way a wide spectrum of vibration frequencies of the casing that is set into vibration can be transferred from the first part of the resonator on the one side of the transition edge to the second part of the resonator on the other side of the transition edge, as a result of which the musical instrument is able to produce a richer sound.

In one embodiment the sound bridge makes no direct contact with the transition edge. In that way a wide spectrum of vibration frequencies of the casing that is set into vibration can be transferred from the first part of the resonator on the one side of the transition edge to the second part of the resonator on the other side of the transition edge, as a result of which the musical instrument is able to produce a richer sound.

In one embodiment the musical instrument comprises a shielding bridge, wherein on the side of the sound bridge facing away from the casing the shielding bridge is situated between the one or more tensioning elements and the sound bridge. The shielding bridge is able to keep the tensioning elements free from the sound bridge, so that the tensioning elements do not directly contact the sound bridge. In that way the sound bridge is able to vibrate freely along with the casing vibrations between the shielding bridge and the casing, without being dampened by the ill vibration conduction properties of the tensioning elements.

In one embodiment the shielding bridge is provided with spacer lugs on the side facing the sound bridge, wherein the shielding bridge touches the sound bridge with the spacer lugs only. The spacer lugs are able to effect an intermediate space between the shielding bridge and the sound bridge, as a result of which the sound bridge is able to vibrate substantially freely with respect to the shielding bridge.

In one embodiment the shielding bridge, with the exception of the spacer lugs, is spaced apart from the sound bridge. Due to the intermediate space the sound bridge is able to vibrate substantially freely with respect to the shielding bridge.

In one embodiment the contacts between the spacer lugs of the shielding bridge and the sound bridge are point contacts. Due to the limited contact surface in the point contacts the sound bridge is able to vibrate substantially freely with respect to the shielding bridge.

In one embodiment the shielding bridge shields the sound bridge, such that the one or more tensioning elements directly contact the shielding bridge and do not directly contact the sound bridge. As a result the sound bridge is able to vibrate freely along with the casing vibrations between the shielding bridge and the casing, without being dampened by the ill vibration conduction properties of the tensioning elements.

In one embodiment the one or more tensioning elements are arranged circumferentially around the casing of the resonator, wherein the one or more tensioning elements extend from the casing towards and preferably over the shielding bridge. The circumferential tensioning elements can simply be slid around the casing of the resonator for at the location of the sound bridge and the shielding bridge via the direct contact with the shielding bridge fixating the sound bridge indirectly with respect to the casing.

In one embodiment the first contact member abuts the first part spaced apart from the transition edge, wherein with respect to the first contact member the second contact member abuts the second part on an opposite side of the transition edge spaced apart from the transition edge, wherein the sound bridge comprises a bridge member that is spaced apart from the transition edge and connects the first contact member and the second contact member to each other. The first contact member is able to take over the vibrations of the first part and via the bridge member and the second contact member transfer it to the second part, without the sound bridge having to contact the transition edge directly.

In one embodiment the column of air when used comprises vibrations having a root chord frequency and overtone vibrations having an overtone frequency, wherein the overtone frequency is the result of multiplying the root chord frequency by an integral, wherein the sound bridge conducts overtone vibrations better than the coupling does. The sound bridge is able to transmit overtone vibrations, particularly overtone vibrations that propagate over the surface of the casing, between two adjacent parts of the resonator, as a result of which the finally produced sound can comprise a wide frequency spectrum.

In one embodiment the column of air when used comprises vibrations having a root chord frequency and undertone vibrations, wherein the undertone frequency is the result of dividing the root chord frequency by an integral, wherein the sound bridge conducts the undertone vibrations better than the coupling does. The sound bridge is able to transmit undertone vibrations between two adjacent parts of the resonator, as a result of which the finally produced sound can comprise a wide frequency spectrum.

In one embodiment the sound bridge has vibration conduction properties that are substantially comparable to those of the casing. The sound bridge and the casing of the resonator which the sound bridge contacts are able to form one vibrating unity having substantially uniform vibration conduction properties.

In one embodiment the coupling comprises a material that is different from the material of the casing. The coupling forms a material transition between the first part and the second part as a result of which the coupling conducts vibrations in the casing badly. The sound bridge is able to effectively bridge the coupling that conducts vibration badly.

In one embodiment the sound bridge is substantially of the same material as the casing. The sound bridge and the casing of the resonator which the sound bridge contacts are able to form one vibrating unity having substantially uniform vibration conduction properties.

In one embodiment the sound bridge is formed out of a solid piece of material. The solid piece of material is able to have substantially uniform vibration conduction properties as a result of which the vibrations that are absorbed in the first contact member are substantially the same as the vibrations that leave the sound bridge via the second contact member.

In one embodiment the sound bridge is made of metal or synthetic material, particularly from the group of metals comprising yellow brass, copper, stainless steel, silver, gold and alpaca, and the group of synthetic materials comprising polycarbonate and acrylonitrile butadiene styrene. The sound bridge can be manufactured of a material that conducts the correct vibration frequencies and with which the desired frequency spectrum of the sounds to be produced can be achieved.

In one embodiment the first part and the second part are a first casing section and a second casing section, respectively, that jointly form the casing of the resonator tube. The sound bridge may form a vibration conducting connection between the casing sections, as a result of which the casing sections are able to resonate more like one unity.

In one embodiment the first part is a mouthpiece and the second part is the casing. The sound bridge is able to form a vibration conducting connection between the mouthpiece and the casing, as a result of which the mouthpiece and the casing are able to resonate more like one unity.

In one embodiment the coupling is a welded joint, a soldered joint, a screwed joint or a cork connection. Welded joints, soldered joints, screwed joints and a cork connection may have worse vibration conduction properties than the sound bridge.

In one embodiment the coupling is a slide fit or a press fit. Slide fits and press fits may have worse vibration conduction properties than the sound bridge.

In one embodiment the resonator is substantially tubular, wherein at the location of the contact members the sound bridge is provided with curved contact surfaces that are substantially complementary to the curvature of the resonator. The curved contact surfaces can provide a stable support of the sound bridge on the resonator.

According to a second aspect the invention provides a sound bridge, apparently suitable for use on a musical instrument according to any one of the preceding embodiments. The sound bridge can be supplied separate from the musical instrument.

According to a third aspect the invention provides a shielding bridge, apparently suitable for use on a musical instrument with a sound bridge according to any one of the preceding embodiments. The sound bridge and the shielding bridge can be supplied separate from the musical instrument.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached schematic drawings, in which.

DETAILED DESCRIPTION OF THE DRAWINGS

Figures 1, 2A, 2B:
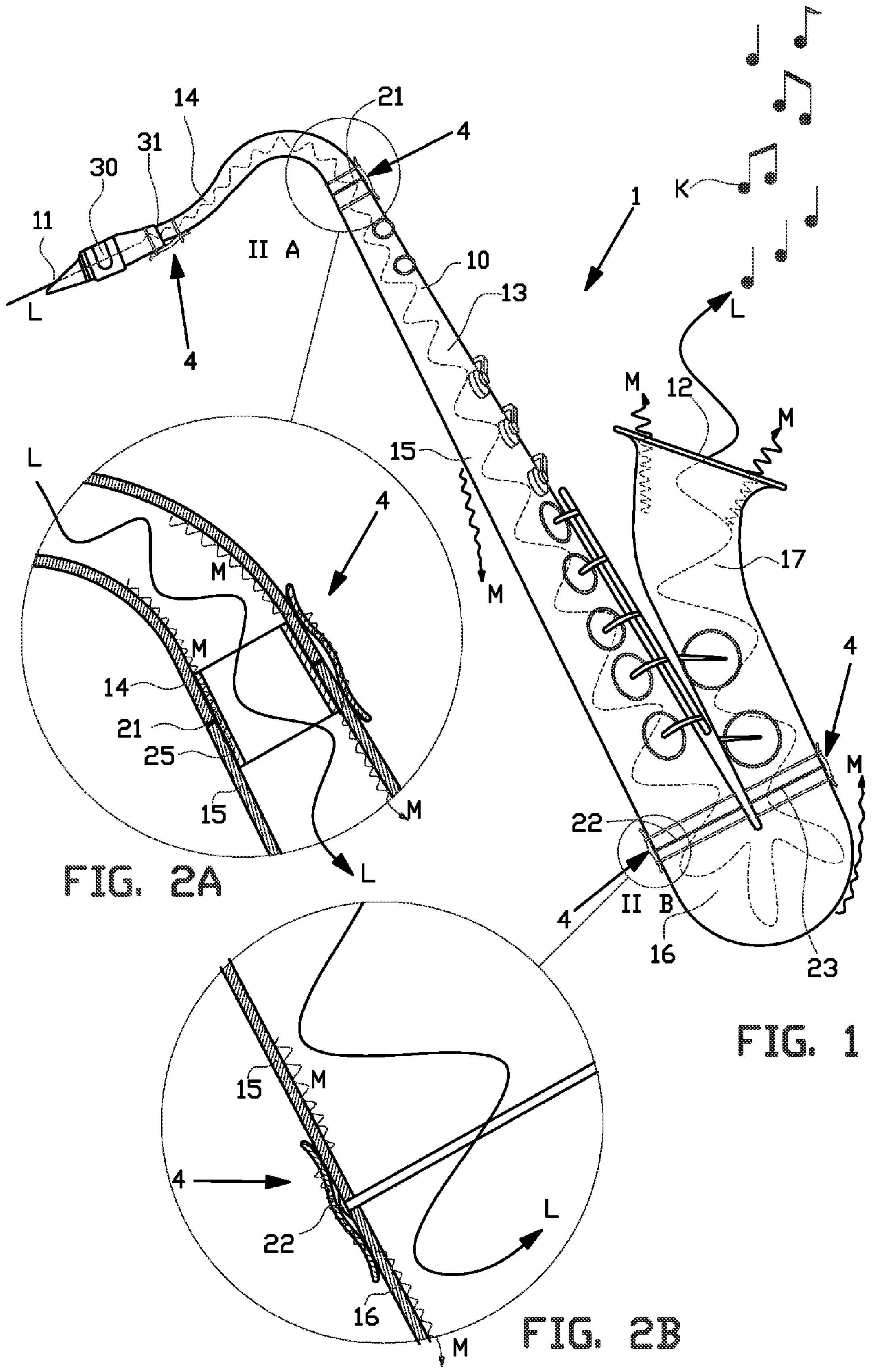
FIG. 1 shows a side view of a saxophone with a first sound bridge assembly according to a first embodiment of the invention.
FIG. 2A shows a longitudinal section of the saxophone with the first sound bridge assembly according to the circle IIA in FIG. 1.
FIG. 2B is a longitudinal section of the saxophone with the first sound bridge assembly according to the circle IIB in FIG. 1.

FIG. 1 shows a musical instrument, particularly a wind instrument, more particularly a saxophone 1.

The saxophone 1 is provided with a sound body or resonator in the shape of an S-shaped, hollow copper resonator tube 10 having a first open outer end 11, a second open outer end 12 and a casing 13 extending in between them. The casing 13 bounds a continuous column of air between the first open outer end 11 and the second open outer end 12 of the resonator tube 12. The casing 13 of the resonator tube 10 consecutively comprises in series a neck part 14, a key part 15, a bend part 16 and a horn part or bell part 17. On the exterior of the casing 13 the saxophone 1 is provided with a first transition edge 21, a second transition edge 22 and a third transition edge 23 that are visible from the outside of the saxophone 1. The transition edges 21-23 are formed by reinforcement bushes or ornamental rings that cover a slide fit and circumferential tin soldered joints, respectively. The slide fit and the soldered joints at the location of the first transition edge 21 connect the neck part 14 and the key part 15, at the location of the second transition edge 22 the key part 15 and the bend part 16, and at the location of the third transition edge 23 the bend part 16 and the bell part 17, respectively, in an airtight manner to each other.

The resonator tube 10 is provided with a mouthpiece 30. With an end edge 31 thereof the mouthpiece 30 is arranged on the casing 13 at the first open outer end 11 of the resonator tube 10, onto which cork is applied that enters into a press fit with the interior of the mouthpiece 30 in order to form an airtight cork connection.

Figure 3:
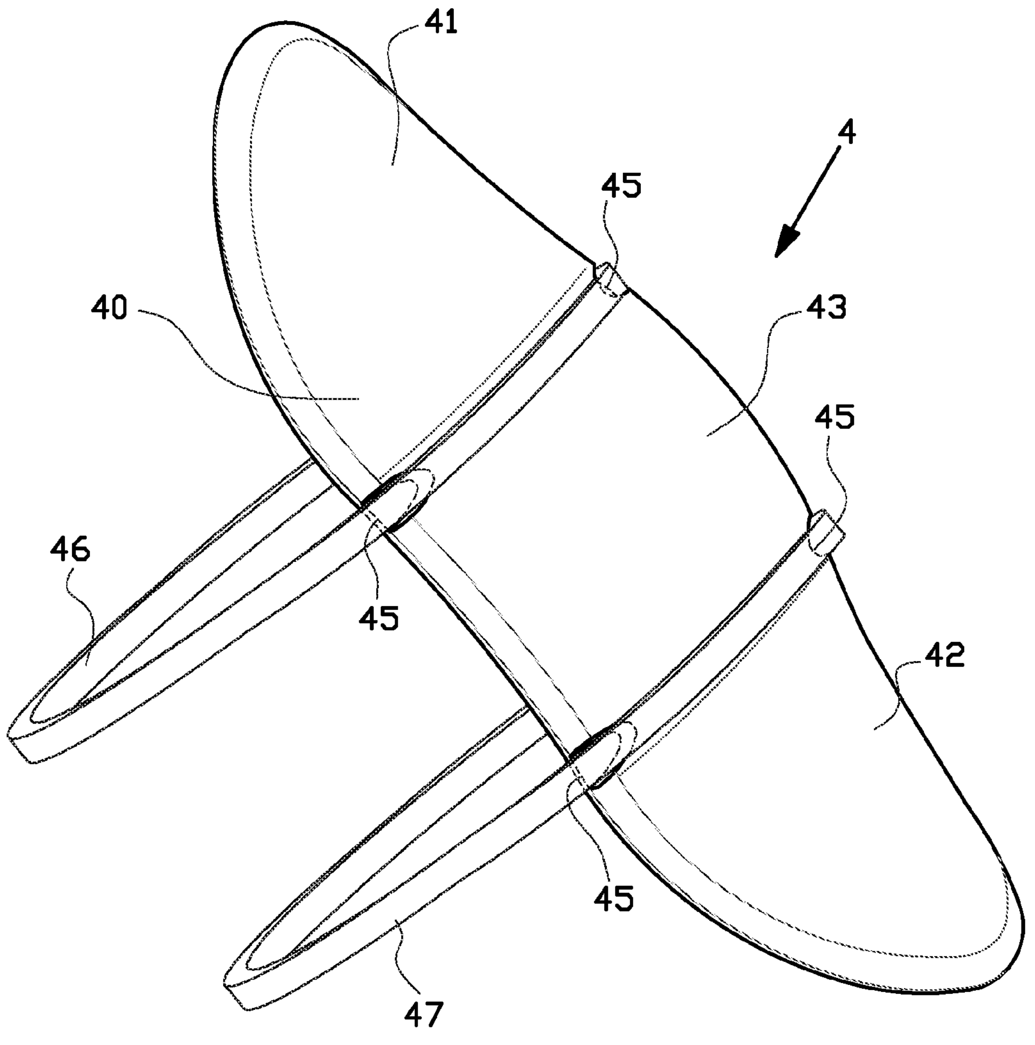
FIG. 3 shows a view in perspective of the first sound bridge assembly according to FIG. 1.

As shown in FIGS. 1 and 2A, at the location of the first transition edge 21 between the neck part 14 and the key part 15, the saxophone 1 is provided with a first sound bridge assembly according to a first embodiment of the invention. The first sound bridge assembly comprises a separate sound bridge 4 which is shown in more detail in FIG. 3 and FIGS. 4A-E. FIG. 3 shows that the sound bridge 4 comprises a solid sound bridge body 40 having a substantially uniform thickness of a few millimeters and an oval-shaped circumferential contour. The solid sound bridge body 40 is made of a metal, in this example of copper. In the longitudinal direction of the oval-shaped circumferential contour the sound bridge 4 is approximately three to four centimeters long. In transverse direction of the oval-shaped circumferential contour the sound bridge 4 is approximately one and a half centimeters wide.

As shown in FIG. 2A at the location of the slide fit underneath the first transition edge 21, the resonator tube 10 comprises a slide fit part 25 soldered to the neck part 14, which slide fit part comprises a narrower outer diameter than the key part 15 or the neck part 14 is provided with a narrowing 25 with respect to the neck part 14. The slide fit part 25 is slid into the key part 15 and abuts the interior of the key part 15 from the interior via a metal on metal slide fit.

As shown in the longitudinal section 4D the sound bridge 4 comprises a first contact member 41 which spaced apart from the first transition edge 21 at the location of the neck part 15 supports in abutting contact on the exterior of the casing 13 of the saxophone 1, a second contact member 42 which spaced apart from the first transition edge 21 at the location of the key part 15 supports in abutting contact on the exterior of the casing 13 of the saxophone 1 and, with respect to the first contact member 41 and the second contact member 42, an elevated bridge member 43 that connects the first contact member 41 and the second contact member 42 to each other. The first contact member 41 and the second contact member 42 do not directly contact the first transition edge 21 and the slide fit situated underneath it.

Although in the description above the sound bridge 4 was only described in relation to the first transition edge 21 of the neck part 14 to the key part 15 and the slide fit arranged at that location, the sound bridge 4 can be arranged in the same way onto each of the other transition edges 21-23 shown in FIG. 1 between the mouthpiece 30, the neck part 14, the key part 15, the bend part 16 and the bell part 17 and end edge 31 of the mouthpiece 30, the slide fit and the soldered joints located there, respectively. As shown in FIGS. 1, 2B and 4D at the location of the second transition edge 22 and third transition edge 23 the saxophone 1 is provided with sound bridges 4. As shown in FIG. 2B at the location of the second transition edge 22 between the key part 15 and the bend part 16 the sound bridge 4 does not directly contact the second transition edge 22 and the soldered joint situated underneath it.

Figure 4A:
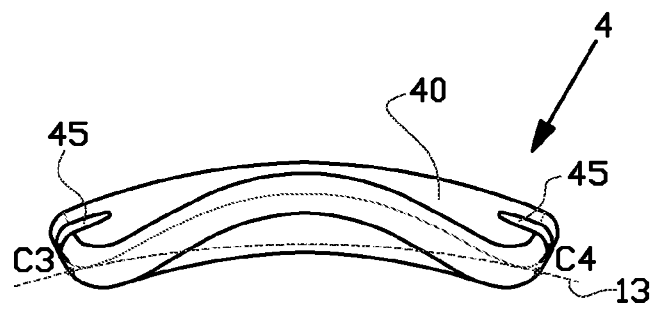
FIGS. 4A, 4B and 4C show a front view, a side view and a top view, respectively, of the first sound bridge assembly according to FIG. 3.
Figure 4C:
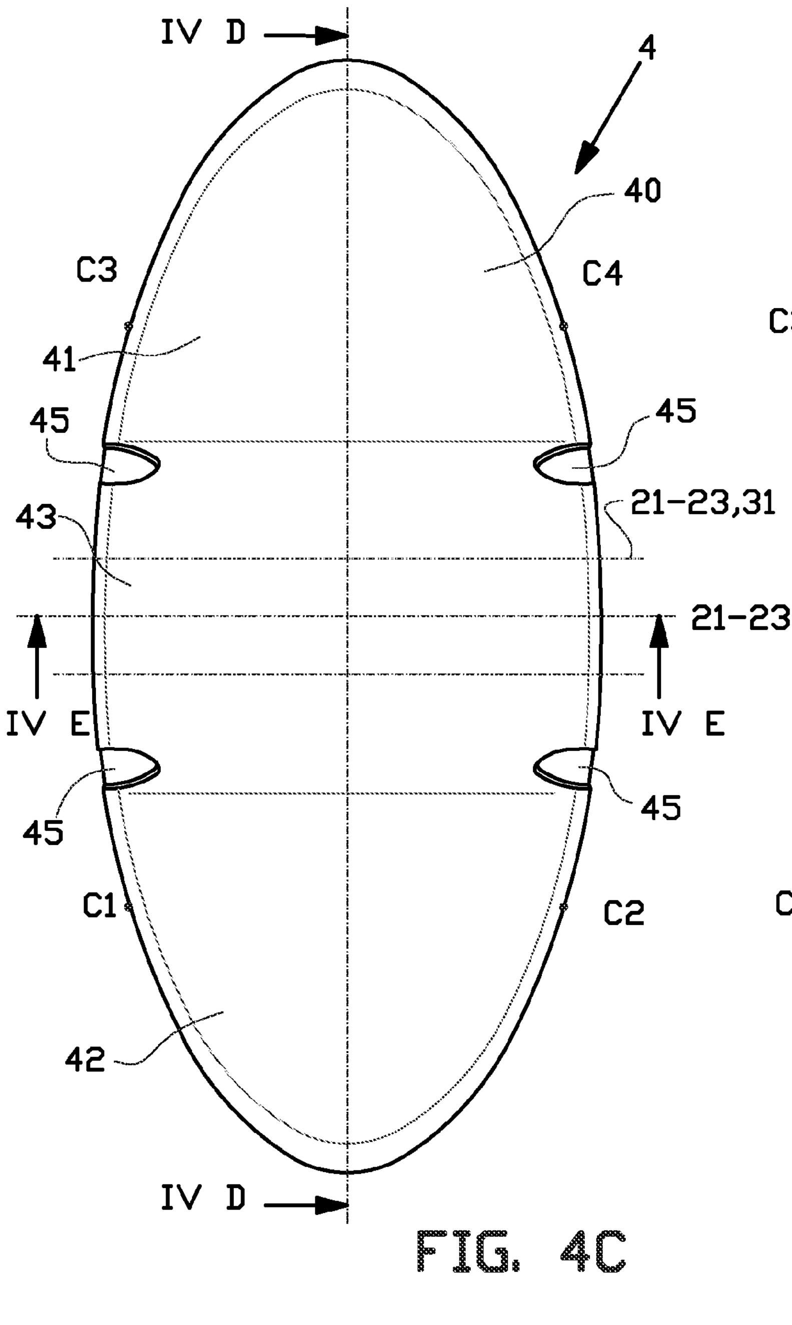
Figure 4B:
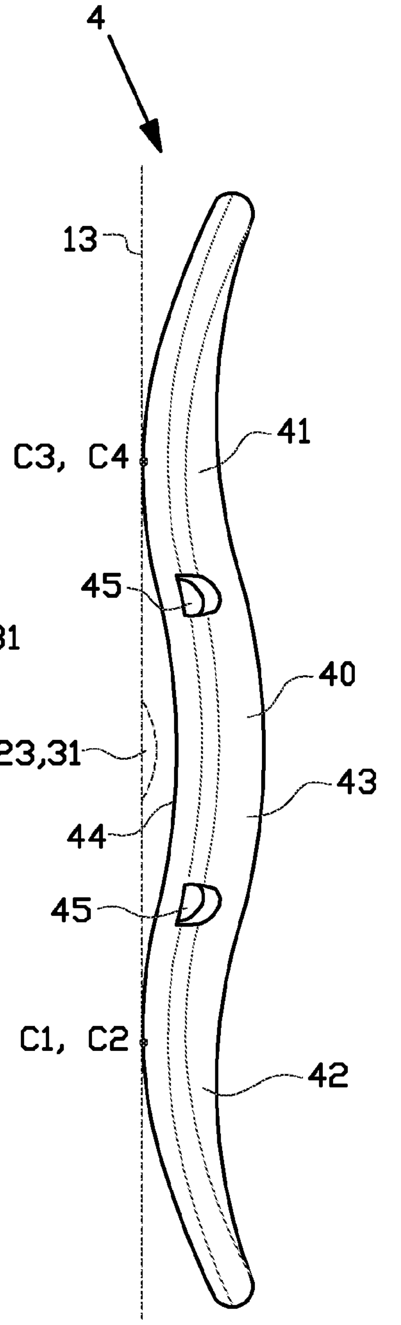
Figure 4D:
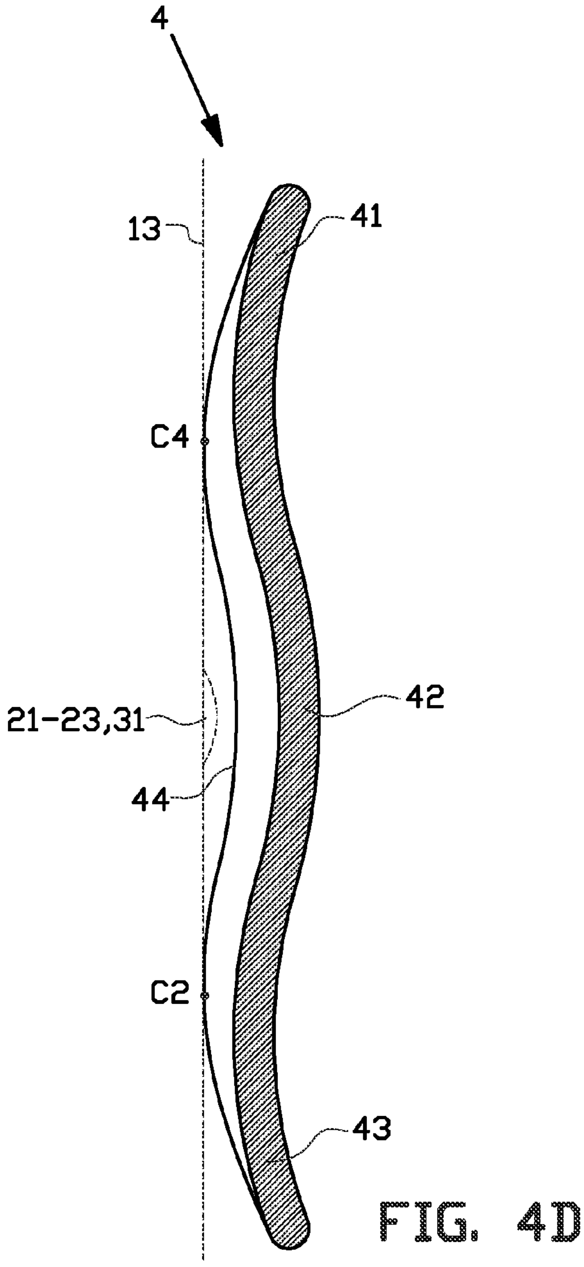
FIG. 4D shows a longitudinal section of the first sound bridge assembly according to the line IV D in FIG. 4C.

FIG. 4B shows that the sound bridge 4 is provided with index slots 45 at four locations where the bridge member 43 at the oval circumferential contour of the sound bridge body 40 merges into the first contact member 41 and the second contact member 42. As shown in FIG. 3 the sound bridge 4 is provided with two circumferential tightening bands 46, 47 that are arranged in said index slots 45. The tightening bands 46, 47 bring the sound bridge body 40 against the casing 13 of the resonator tube 10 under tensioning force, pressure force or clamping force abutting in the contact points C1, C2, C3 and C4.

Figure 4E:
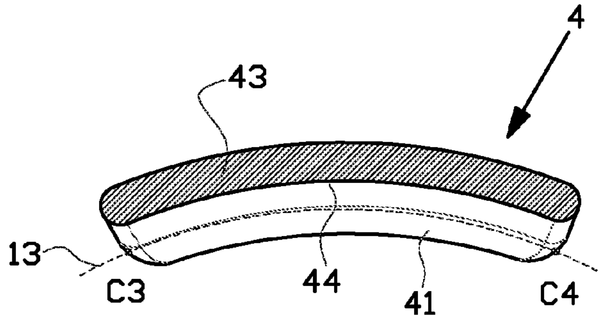
FIG. 4E shows a cross-section of the first sound bridge assembly according to the line IV E in FIG. 4C.

As shown in FIGS. 4B and 4E the solid sound bridge body 40 is provided with a curvature in the transverse direction of the oval-shaped circumferential contour, which curvature is concave on the side facing the casing 13. The concave lower side of the solid sound bridge body 40 as a result connects substantially to the convex curvature of the casing 13 of the resonator tube 10. In this example the contact points between the sound bridge 4 and the casing 13 are indicated with C1 and C2 for the second contact member 42 and C3 and C4 for the first contact member 41.

As shown in FIGS. 4B and 4D the solid sound bridge body 40 in its longitudinal direction is provided with a convex curvature facing the casing 13 underneath the first contact member 41, a concave curvature facing the casing 13 underneath bridge member 43 and a convex curvature facing the casing 13 underneath the second contact member 42. The concave curvatures underneath the bridge member 43 in both the transverse direction and the longitudinal direction of the sound bridge body 40 form a concave doubly curved bridging surface 44 facing the casing 13. Underneath the bridge member 43 the bridging surface 44 offers room to the first transition edge 21 arranged at the location of the slide fit between the neck part 14 and the key part 15. Preferably an intermediate space or a free space is present between the bridge member 43 and the first transition edge 21, as a result of which the sound bridge 4 does not directly contact the first transition edge 21 and the slide fit situated underneath it.

The operation of the saxophone 1 with the first sound bridge assembly according to the first embodiment of the invention will be explained on the basis of FIGS. 1 and 2.

FIG. 1 shows how the column of air present in the casing 13 can be set into vibration by blowing air through the casing 13 via the mouthpiece 30. The vibration in the column of air is schematically shown as air vibration L. The air vibration L, depending on the length of the resonator tube 10 is given a vibration frequency. The column of air leaves the resonator tube 10 via the bell part 17 at the outer end of the resonator tube 10 that faces away from the mouthpiece 30, at which location the air vibration L in cooperation with the resonator tube 10 produces a sound of a certain root chord. The root chord has a frequency that corresponds with the frequency of the air vibration L. The length of the resonator tube 10 can be effectively shortened by the keys on the key part 15 in order to change the frequency of the air vibration L and the related root chord of the sound.

FIG. 2A schematically shows in longitudinal section the casing 13 of the resonator tube 10 at the location of the slide fit 21 between the neck part 14 and the key part 15. The air vibrations L with a high frequency with respect to the root chord have the characteristic of propagating closely along the casing 13 of the resonator tube 10. Particularly the overtones, of which the vibration frequencies are the result of multiplying the frequency of the root chord of the air vibration L by an integral, are taken over by the resonator tube 10. Other vibration frequencies as well of the column of air, for instance low frequency vibrations such as undertones, depending on the effective length of the resonator tube 10 are taken over by the casing 13 to a higher or lesser degree. The undertone vibrations have vibration frequencies that are the result of dividing the frequency of the root chord of the air vibration L by an integral. The vibrations taken over propagate in the casing 13 and/or over the surface of the casing 13 and are schematically indicated as resonance vibrations or casing vibrations M. FIG. 1 schematically shows that the air vibrations L of the column of air and the casing vibrations M in the casing 13 cooperate in order to produce an audible sound K via the bell part 17 at the outer end of the resonator tube 10 that faces away from the mouthpiece 30.

The final spectrum of frequencies that is present in the produced sound K depends on the resonance properties or vibration conduction properties of the resonator tube 10 or the degree to which the resonator tube 10 conducts the casing vibrations M. The cork connection in the mouthpiece 30 and the tin soldered joints have different material properties than the copper of the resonator tube 10 has, as a result of which they form a material transition that conducts the casing vibrations M taken over, badly or not at all. As at the location of the metal on metal slide fit underneath the first transition edge 21, the casing vibrations M are moreover only transmitted via the abutting contact between the neck part 14 and the key part 15 at the interior of the hollow resonator tube 10, a part of the casing vibrations M propagating to the outside is lost, as a result of which the saxophone a looses a part of the timbre or sound vibrancy.

At the location of the material transitions and/or the transition edges 21-23 between parts 14-17 of the resonator tube 10, where the sound bridges 4 have been arranged they offer an alternative route for the casing vibrations M propagating through the casing 13. The casing vibrations M which from the casing 13 via the first contact member 41 propagate through the sound bridges 4 do not directly contact the end edge 31 of the mouthpiece 30 and the transition edges 21-23 situated underneath the sound bridges 4 at the location of the slide fit and the soldered joints, respectively, as a result of which they are able to continue substantially undiminished from the second contact member 42 of the sound bridge 4 to the next part 14-17 of the resonator tube 10. As a result the casing vibrations M can also contribute to the sound vibrancy of the instrument, because, as shown in FIG. 1, during propagation through the casing 13 they set the air at the exterior of the casing 13 into vibration.

The sound bridge 4 shown in FIG. 3 and FIGS. 4A-E is placed on a saxophone 1 in FIG. 1. However, the sound bridge 4 can also be placed on other instruments, for instance on a clarinet 101 as shown in FIG. 5, on a transverse flute 201 as shown in FIG. 6 or on a trumpet 301 as shown in FIG. 7.

Figure 5:
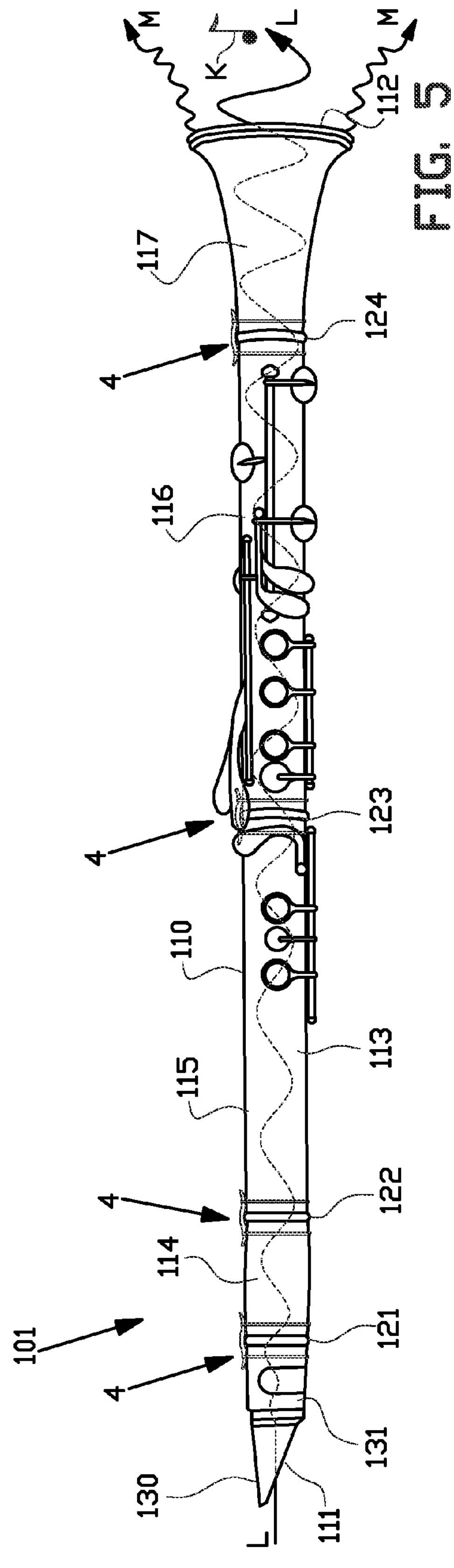
FIG. 5 shows a side view of a clarinet with the first sound bridge assembly according to FIG. 3.

As shown in FIG. 5 the clarinet 101, which is considered a woodwind instrument, in this example is provided with a resonator in the form of a hollow resonator tube 110 having a first open outer end 111, a second open outer end 112 and a wooden casing 113 extending in between them. Between the first open outer end 111 and the second open outer end 112 of the resonator tube 110 the casing 113 bounds a continuous column of air. The casing 113 of the resonator tube 110 consecutively comprises a neck part 114, a first key part 115, a second key part 116 and a horn part or bell part 117. The clarinet 101 is provided with annular connections 121, 122, 123 that connect the neck part 114 and the first key part 115, the first key part 115 and the second key part 116, and the second key part 116 and the bell part 117, respectively, to each other. The clarinet 101, just like the saxophone 1, comprises a mouthpiece 130 that enters into a press fit with cork with the casing 113 around the first open outer end 112 of the resonator tube 10.

In a comparable manner to what is described for the saxophone 1 according to FIGS. 1 and 2, the sound bridge 4 according to the invention can be arranged on the clarinet 101 at the location of the annular connections 121-123 or the end edge 131 of the mouthpiece 130.

Figure 6:
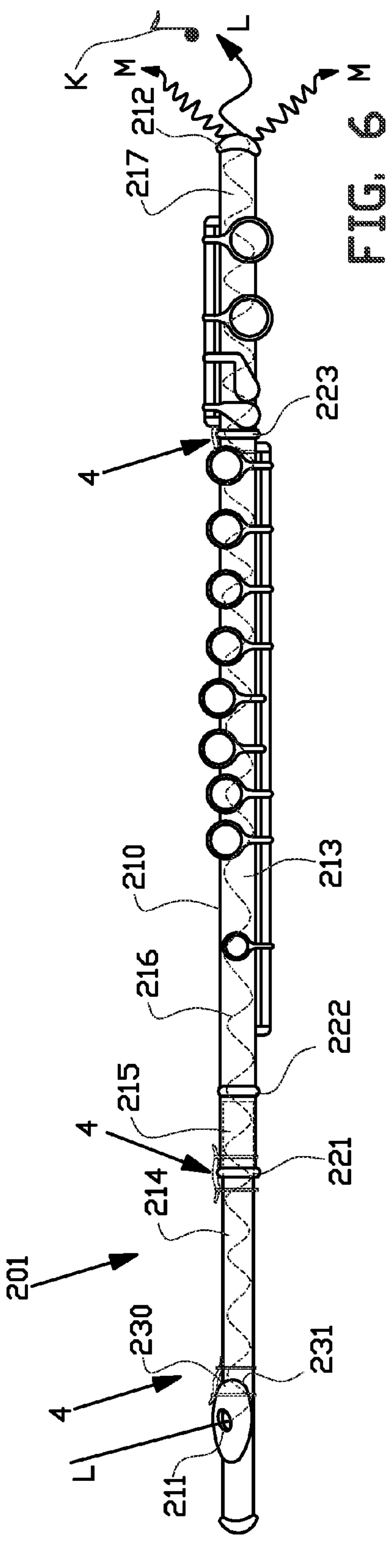
FIG. 6 shows a side view of a transverse flute with the first sound bridge assembly according to FIG. 3.
Figure 7:
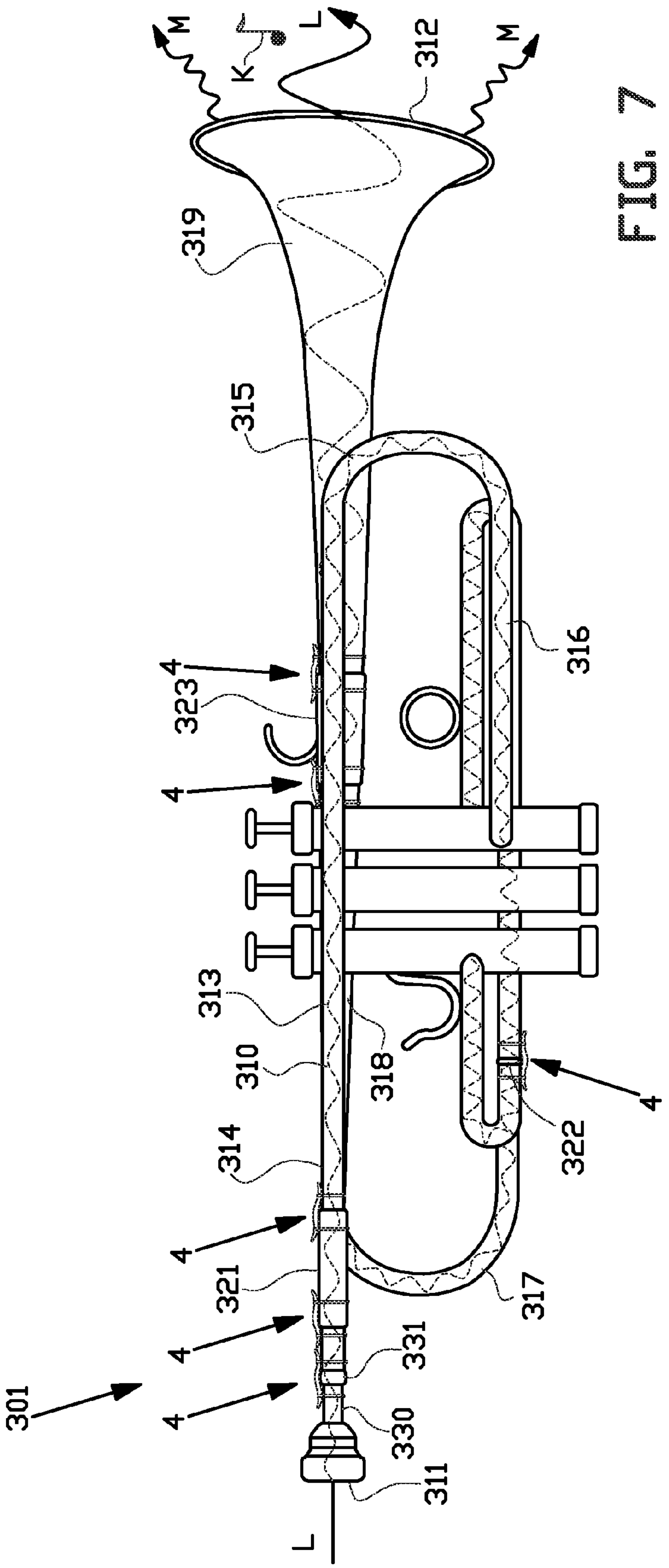
FIG. 7 shows a side view of a trumpet with the first sound bridge assembly according to FIG. 3.

As shown in FIG. 6 the transverse flute 201 in this example comprises a resonator in the form of a straight, hollow resonator tube 210 having an opening 211 near a first outer end, an open second outer end 212 and a casing 213 extending in between them. The casing 213 of the resonator tube 210 consecutively comprises a head piece part 214, a fitting part 215 and a key part 16 and a foot part 17. The fitting part 215 is bounded by a first transition edge 221 and a second transition edge 222. The head piece part 214 has a narrower outer diameter than the fitting part 215 has or is narrowed with respect to the fitting part 215. The mouthpiece part 214 is slid into the fitting part 215 up to the second transition edge 222 and from the interior abuts the fitting part 215 via a slide fit. The mouthpiece part 214 is provided with a lip plate or mouthpiece 230 situated around the opening 211 which mouthpiece is fixedly connected to the casing 213 by a soldered joint 231. Air can be blown via the mouthpiece 230 through the opening 211 into the casing 213. The column of air L present in the casing 213 is set into vibration as a result, wherein the casing 213 takes over the vibration to a greater or lesser extent as casing vibrations M. At the location of the soldered joint 231 the sound bridge 4 according to the invention is able to transfer the vibrations of the mouthpiece 230 directly onto the mouthpiece part 214.

In case of the transverse flute 201 there is another disadvantageous phenomenon. Because the casing vibrations M are only transmitted via the abutting contact between the mouthpiece part 214 and the fitting part 215 at the interior of the hollow resonator tube 210, a part of the casing vibrations M propagating to the outside will be lost, as a result of which the transverse flute 201 looses a part of its timbre or sound vibrancy. At the location of the slide fit of the mouthpiece part 214 into the fitting part 215 the sound bridge 4 is able to directly transfer the casing vibrations M from the mouthpiece part 214 onto the exterior of the casing 213 at the location of the first transition edge 221. In that way it is counteracted that the casing vibrations M loose their effect at the exterior of the casing 213. The timbre or sound vibrancy of the transverse flute 201 is thus preserved. As shown in FIG. 6 the sound bridge 4 can also be arranged on other outer edges 222-223 or on the transition 231 between the mouthpiece 230 and the casing 213.

As shown in FIG. 7 the trumpet 301, which is considered a brass instrument, in this example comprises resonator in the form of a hollow resonator tube 310 having a first open outer end 311, a second open outer end 312 and a copper casing 313 extending in between them. Between the first open outer end 311 and the second open outer end 312 of the resonator tube 310 the casing 313 bounds a continuous column of air. The casing 313 of the resonator tube 310 comprises a mouthpiece 330, a key part 314, a first bend part 315, a valve part 316, a second bend part 317, a second tube part 318 and a horn part or bell part 319. The trumpet 301 is provided with reinforcement bushes 321, 322, 323 with underneath them soldered joints that connect the parts 314-319 of the casing 313 to each other. The trumpet 301 comprises a mouthpiece 330 that enters into a slide fit with the casing 313 around the first open outer end 312 of the resonator tube 310.

In a comparable manner to what is described for the saxophone 1 according to FIGS. 1 and 2, the sound bridge 4 according to the invention can be placed on the trumpet 301 at the locations of the annular connections 321-323 or the end edge 331 of the mouthpiece 330.

The above description is included to illustrate the operation of preferred embodiments of the invention and not to limit the scope of the invention. Starting from the above explanation many variations that fall within the spirit and scope of the present invention will be evident to an expert.

For instance the sound bridge 4 according to the invention can also be used on musical instruments of for instance copper, yellow brass, silver gold and wood. Depending on the musical instrument and the desired frequency spectrum of the sounds to be produced, the sound bridge 4 can be made of a material conducting the correct vibration frequencies. The group of suitable materials among others includes metals, particularly yellow brass, copper, stainless steel, silver, gold and alpaca, and synthetic materials, particularly polycarbonate or acrylonitrile butadiene styrene.

Figure 8:
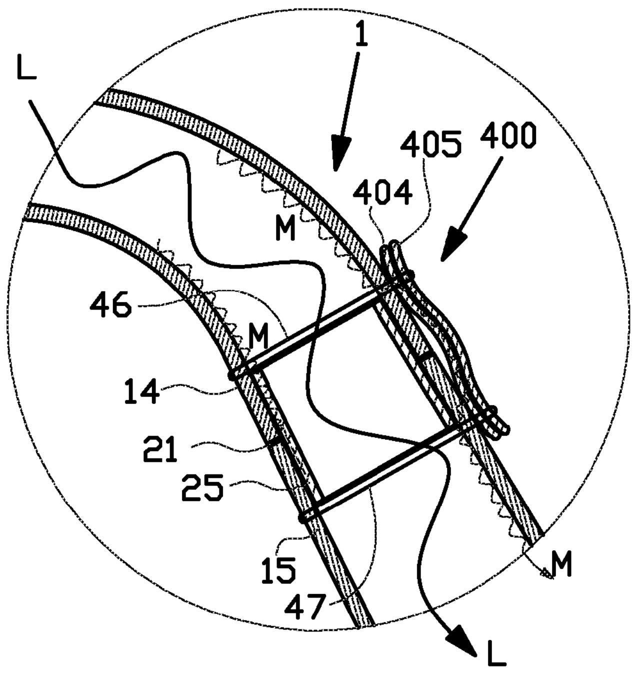
FIG. 8 shows a longitudinal section of the saxophone with a second sound bridge assembly according to an alternative embodiment of the invention.

FIG. 8 shows the saxophone 1 according to FIG. 1, which at the location of the first transition edge 21 between the neck part 14 and the key part 15 is provided with a second sound bridge assembly 400 according to a second embodiment of the invention. The second sound bridge assembly 400 comprises a separate sound bridge 404 and a separate shielding bridge 405 that are complementarily shaped with respect to each other and placed on each other. The sound bridge 404 sits or supports on the casing 13 of the saxophone 1 and the shielding bridge 405 sits or is supported on the sound bridge 404. The sound bridge 404 and the shielding bridge 405 are shown in more detail in FIGS. 9A-E.

The sound bridge 404 is substantially identical to the sound bridge 4 according to the first embodiment of the invention described above and as such comprises a sound bridge body 440 having a first contact member 441, a second contact member 442, a bridge member 443 and a doubly curved concave bridging surface 444. As shown in FIG. 9 at the location of the first transition edge 21 the sound bridge 404 is placed in abutting contact in the contact points C1-C4 on the casing 13 of the resonator tube 10. The sound bridge 404 according to the second embodiment of the invention just like the sound bridge 4 according to the first embodiment of the invention transfers the casing vibrations M propagating through the casing 13 substantially undiminished from the one part to the other part of the resonator tube 10, without contacting the first transition edge 21.

Figure 9A:
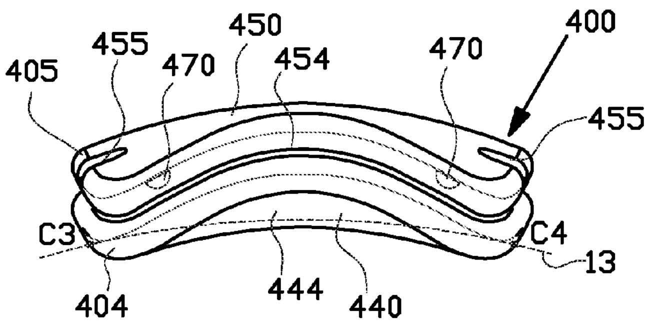
FIGS. 9A, 9B and 9C show a front view, a side view and a top view, respectively, of the second sound bridge assembly according to FIG. 8.
Figure 9C:
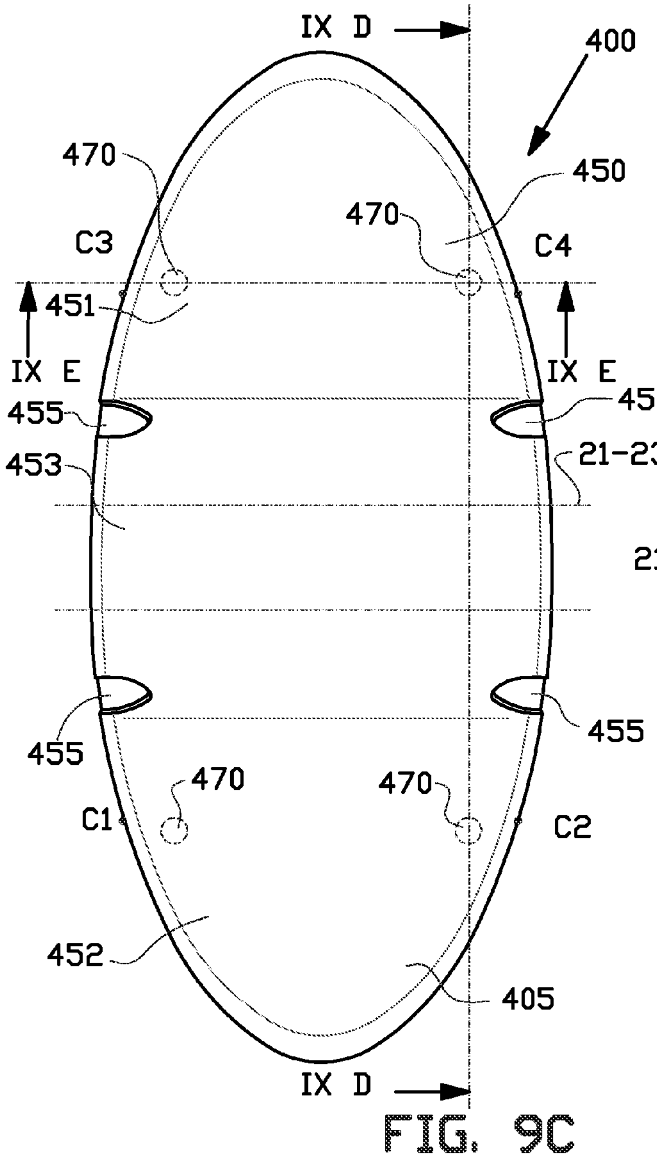
Figure 9B:
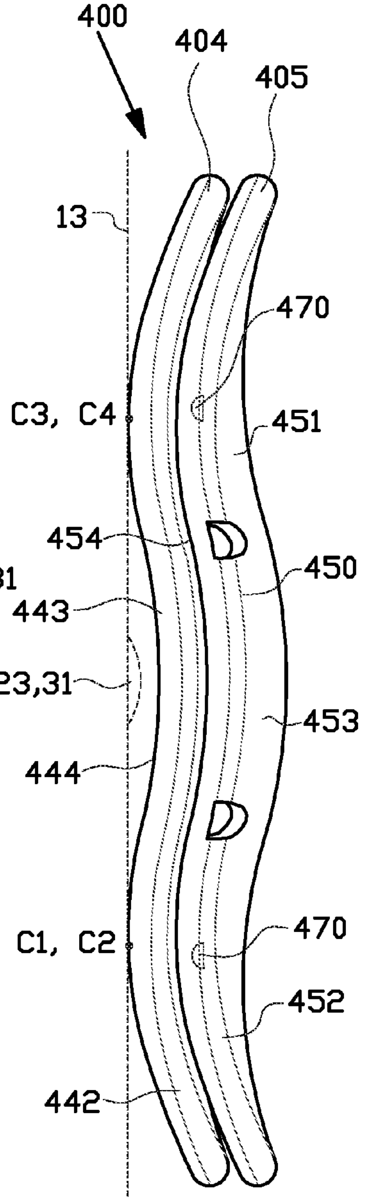

As shown in FIGS. 9A-C the sound bridge 404 according to the second embodiment of the sound bridge 4 according to the first embodiment differs in that in the sound bridge 404 according to the second embodiment the index slots for the tightening bands 46, 47 are absent. In this embodiment the tightening bands 46, 47 after all do not directly contact the sound bridge 404.

Figure 9D:
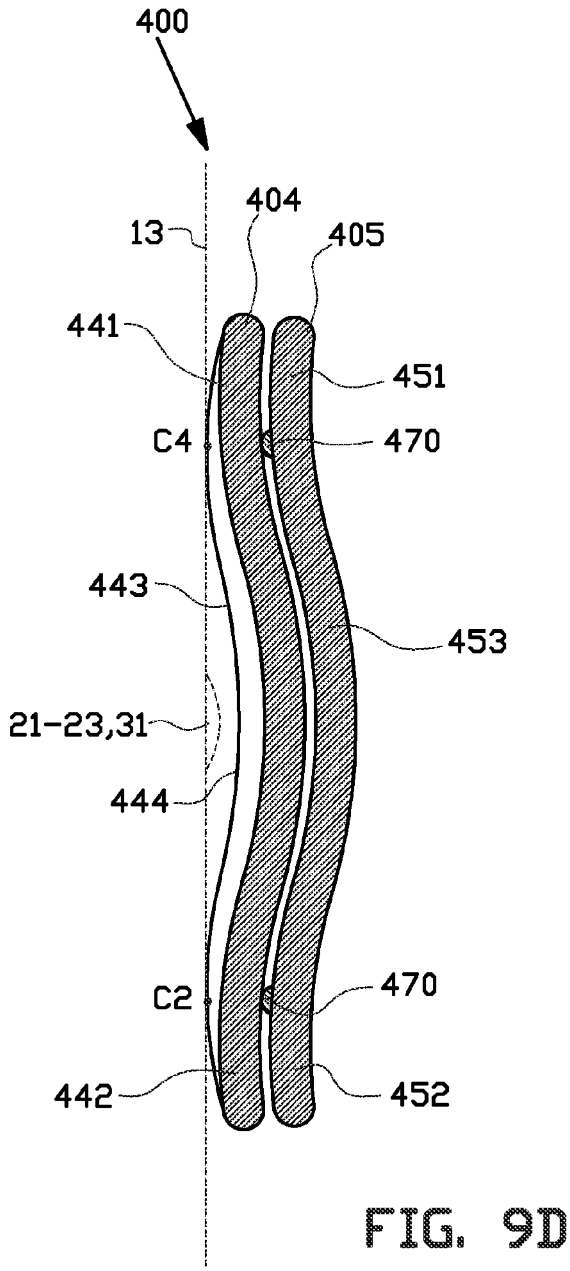
FIG. 9D shows a longitudinal section of the second sound bridge assembly according to the line IX D in FIG. 9C.
Figure 9E:
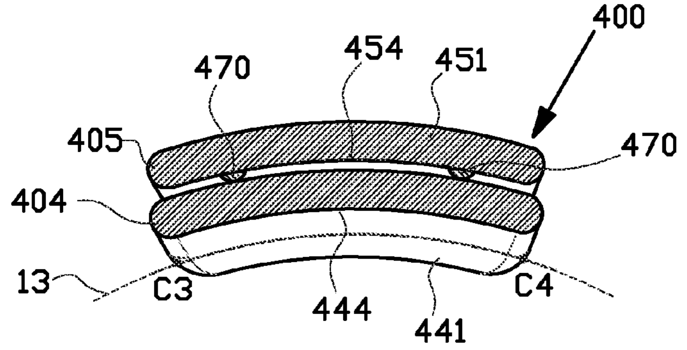
FIG. 9E shows a cross-section of the second sound bridge assembly according to the line IX E in FIG. 9C.

The shielding bridge 405 is provided with a shielding bridge body 450 that is substantially identical to the sound bridge body 440 of the sound bridge 404. The shielding bridge 405 differs from the sound bridge 404 in that the shielding bridge 405 is provided with four index slots 455 in the convex upper surface for receiving the tightening bands 46, 47. Moreover the shielding bridge 405, as shown in FIGS. 9D and 9E, at the concave, doubly curved bridging surface 454 facing the casing 13 of the saxophone 1 and the upper surface of the sound bridge 404, is provided with four spaced apart spacer lugs 470. In this example the four spacer lugs 470 are formed by studs, convex projections or semi-spheres that are elevated or project approximately one millimeter from the bridging surface 454.

With its four spacer lugs 470 the shielding bridge 405 is placed on the upper surface of the sound bridge 404 in abutting contact in a stable four-point support. The sound bridge body 440 and the shielding bridge body 450 are complementarily shaped with respect to each other, in the sense that the doubly curved, concave bridging surface 454 of the shielding bridge 405 follows the shape of the convex upper surface of the sound bridge 404. In the supported condition the sound bridge 404 and the shielding bridge 405 extend substantially parallel to each other, in the sense that the intermediate space between the sound bridge body 440 and the shielding bridge body 450 transverse to the bridging surface 454 is substantially constant. The sound bridge body 440 and the shielding bridge body 450 are separated from each other by the spacer lugs 470, wherein the shielding bridge 405 only contacts the sound bridge 404 with the tips of the convex spacer lugs 470 in the point contacts. Due to the convex shape of the spacer lugs 470 the contact surface between the sound bridge 404 and the shielding bridge 405 is minimal.

The operation of the saxophone 1 with the second sound bridge assembly 400 according to the second embodiment of the invention will be explained on the basis of FIG. 8.

In order to achieve the situation as shown in FIG. 8, the musician arranges the sound bridge 404 on the casing 13 of the saxophone 1 at the location of the first transition edge 21 between the neck part 14 and the key part 15. The sound bridge 404 at that moment still sits loose on the casing 13. Subsequently the shielding bridge 405 is placed on the sound bridge 404, wherein only the spacer lugs 470 of the shielding bridge 405 contact the sound bridge 404. The musician keeps both sound bridges 404, 405 in their places until the tightening bands 46, 37 are slid around the casing 13 and are tensioned over the shielding bridge 405. The tightening bands 46, 47 are kept in their places by the index slots 455 in the upper surface of the shielding bridge 405. The tightening bands 46, 47 extend from the casing 13 to and over the shielding bridge 405 without contacting the sound bridge 404. Due to the elasticity of the tightening bands 46, 47 the second sound bridge assembly 400 is fixated against the casing 13 and, as regards position, with respect to the casing 13 under pressure force or clamping force. The musician can now let go of the sound bridge 404 and the shielding bridge 405.

In the situation as shown in FIG. 8 the sound bridge 404 is situated between the casing 13 and the second sound bridge 405. The shielding bridge 405 shields the sound bridge 404, so that the tightening bands 46, 47 tensioned over the shielding bridge 405 do not directly contact the sound bridge 404. As a result the sound bridge 404 can freely vibrate along with the casing vibrations M between the shielding bridge 405 and the casing 13. without being dampened by the bad vibration conduction properties of the tightening bands 46, 47. The shielding bridge 405 is indeed dampened by the tightening bands 46, 47. Due to the limited contact surface between the shielding bridge 405 and the sound bridge 404 via the spacer lugs 470, said dampening has a highly limited influence only on the vibration conduction properties of the sound bridge 404.

The invention claimed is:

1. Musical instrument, particularly a wind instrument, having a hollow resonator, wherein the resonator is—provided with a casing bounding a continuous column of air and an opening in the casing for producing a sound through the opening, wherein when used the column of air is set into vibration, wherein the casing at least partially takes over the vibration of the column of air, wherein the resonator comprises a first part and a second part in series, wherein the musical instrument is provided with a coupling between the first part and the second part, wherein at the side of the casing facing the outside of the coupling is bounded by a transition edge between the first part and the second part, wherein the musical instrument is provided with a sound bridge and one or more tensioning elements for arranging the sound bridge under clamping force in abutting contact onto the exterior of the resonator, wherein at a first outer end the sound bridge is provided with a first contact member which is arranged under clamping force in abutting contact onto the first part of the resonator, wherein at a second outer end the sound bridge is provided with a second contact member which is arranged under clamping force in abutting contact onto the second part of the resonator, and wherein the sound bridge is spaced apart from the transition edge.

2. Musical instrument according to claim 1, wherein the sound bridge makes no direct contact with the transition edge.

3. Musical instrument according to claim 1, wherein the musical instrument comprises a shielding bridge, wherein on the side of the sound bridge facing away from the casing the shielding bridge is situated between the one or more tensioning elements and the sound bridge.

4. Musical instrument according to claim 3, wherein the shielding bridge is provided with spacer lugs on the side facing the sound bridge, wherein the shielding bridge touches the sound bridge with the spacer lugs only.

5. Musical instrument according to claim 4, wherein, the shielding bridge, with the exception of the spacer lugs, is spaced apart from the sound bridge.

6. Musical instrument according to claim 4, wherein the contacts between the spacer lugs of the shielding bridge and the sound bridge are point contacts.

7. Musical instrument according to claim 3, wherein the shielding bridge shields the sound bridge, such that the one or more tensioning elements directly contact the shielding bridge and do not directly contact the sound bridge.

8. Musical instrument according to claim 3, wherein the one or more tensioning elements are arranged circumferentially around the casing of the resonator, wherein the one or more tensioning elements extend from the casing towards and preferably over the shielding bridge.

9. Musical instrument according to claim 1, wherein the first contact member abuts the first part spaced apart from the transition edge, wherein with respect to the first contact member the second contact member abuts the second part on an opposite side of the transition edge spaced apart from the transition edge, wherein the sound bridge comprises a bridge member that is spaced apart from the transition edge and connects the first contact member and the second contact member to each other.

10. Musical instrument according to claim 1, wherein the column of air when used comprises vibrations having a root chord frequency and overtone vibrations having an overtone frequency, wherein the overtone frequency is the result of multiplying the root chord frequency by an integral, wherein the sound bridge conducts overtone vibrations better than the coupling does.

11. Musical instrument according to claim 1, wherein the column of air when used comprises vibrations having a root chord frequency and undertone vibrations, wherein the undertone frequency is the result of dividing the root chord frequency by an integral, wherein the sound bridge conducts the undertone vibrations better than the coupling does.

12. Musical instrument according to claim 1, wherein the sound bridge has vibration conduction properties that are substantially comparable to those of the casing.

13. Musical instrument according to claim 1, wherein the coupling comprises a material that is different from the material of the casing.

14. Musical instrument according to claim 1, wherein the sound bridge is substantially of the same material as the casing.

15. Musical instrument according to claim 1, wherein the sound bridge is formed out of a solid piece of material.

16. Musical instrument according to claim 1, wherein sound bridge is made of metal or synthetic material, particularly from the group of metals comprising yellow brass, copper, stainless steel, silver, gold and alpaca, and the group of synthetic materials comprising polycarbonate and acrylonitrile butadiene styrene.

17. Musical instrument according to claim 1, wherein the first part and the second part are a first casing section and a second casing section, respectively, that jointly form the casing of the resonator tube.

18. Musical instrument according to claim 1, wherein the first part is a mouthpiece and wherein the second part is the casing.

19. Musical instrument according to claim 1, wherein the coupling is a welded joint, a soldered joint, a screwed joint or, a cork connection.

20. Musical instrument according to claim 1, wherein the resonator is substantially tubular, wherein at the location of the contact members the sound bridge is provided with curved contact surfaces that are substantially complementary to the curvature of the resonator.

21. Sound bridge, apparently suitable for use on a musical instrument according to claim 1.

* * * * *